United States Patent Office 3,485,329
Patented Dec. 23, 1969

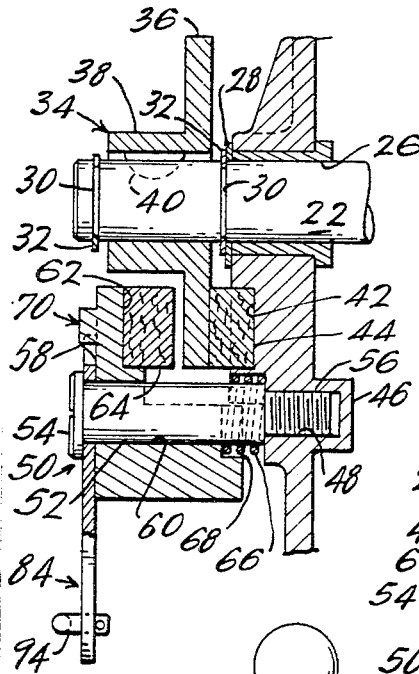
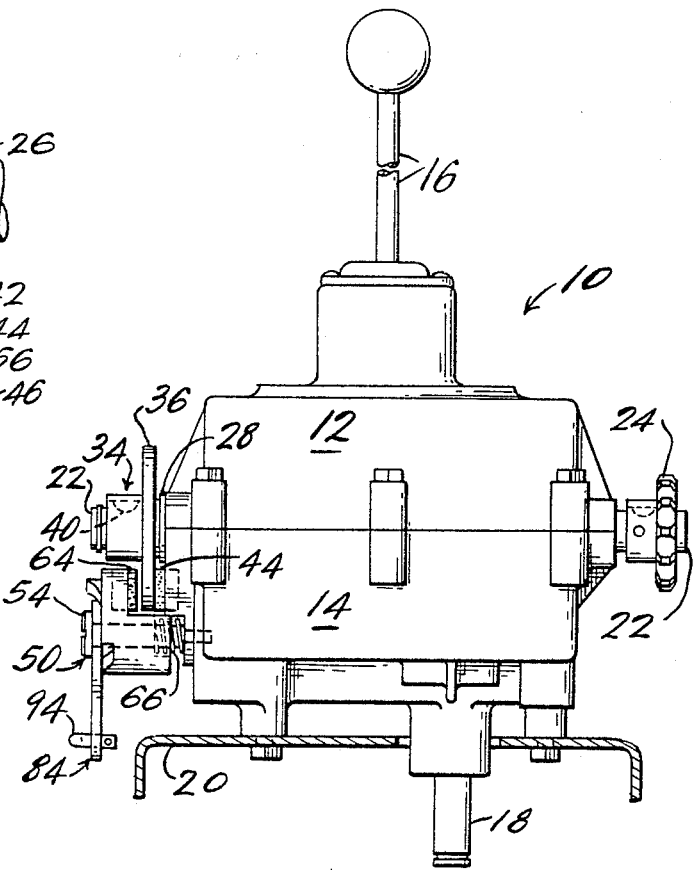
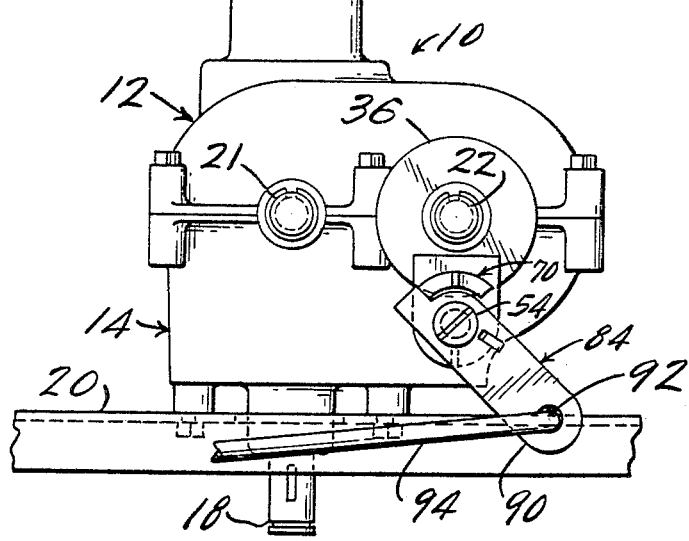

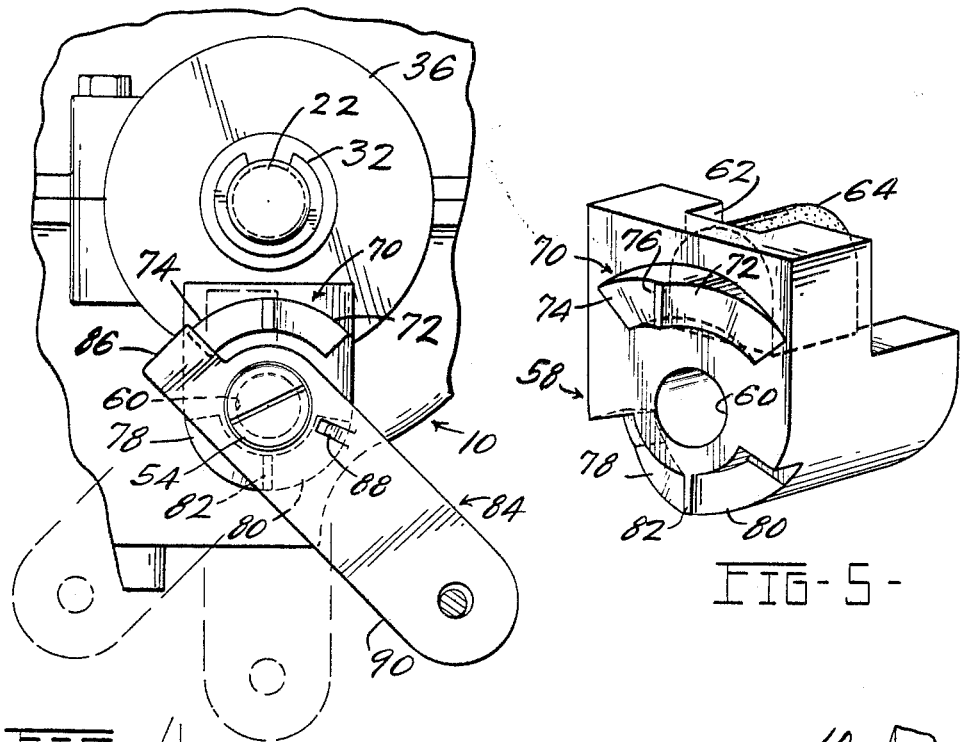
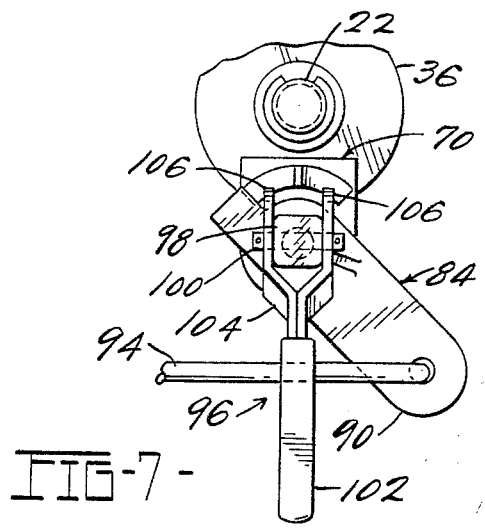
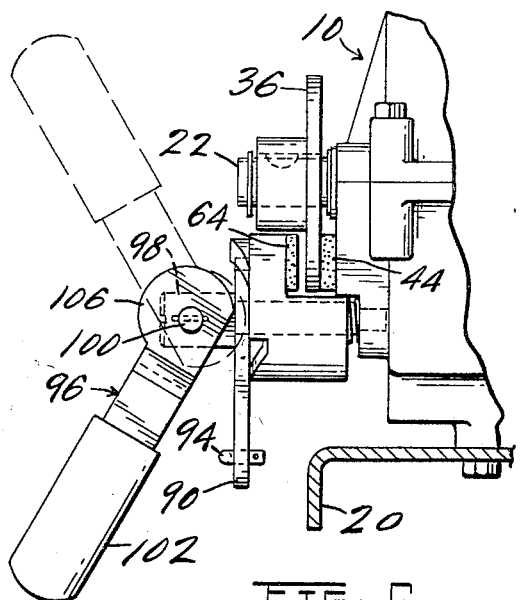

1

3,485,329
TRANSMISSION WITH BRAKE
Hans Hauser, Fredericktown, Ohio, assignor to The J. B. Foote Foundry Co., Fredericktown, Ohio, a corporation of Ohio
Filed Oct. 6, 1967, Ser. No. 673,483
Int. Cl. F16h 57/10; F16d 55/224
U.S. Cl. 192—4    11 Claims

ABSTRACT OF THE DISCLOSURE

A transmission has a brake combined therewith in one unit. The combined unit saves considerable labor costs in the manufacture of products using the invention, e.g. riding lawn mowers, snowmobiles, etc. Manufacturers of such products usually buy the transmissions from suppliers and with the invention, the supplier can provide both transmission and brake in a single package so that practically no extra assembly costs are involved for the brake components, as is now the case. The brake embodied in the invention preferably is of a disc-type which is compact and thus particularly suitable in the instant combination. The brake laso can be used as an emergency or parking brake.

---

This invention relates to a transmission having a brake combined therewith.

It is a common practice in the production of small vehicles such as riding lawn mowers, snowmobiles, golf carts, etc. for the manufacturer to buy transmissions from outside sources. Whether or not the transmission is purchased outside, the manufacturer must provide suitable brakes for the vehicle and these usually are in the nature of conventional shoe-type brakes mounted on the live axle of the vehicle and operated by a foot pedal. Such brakes have a number of components which must be assembled with the vehicle and the axle, thereby involving substantial labor expense. The brakes also require extra space which often makes the design of the vehicle more difficult and may add to the size and, consequently, the cost thereof. Further, the brake usually is mounted on the axle so as to be exposed and subject to possible damage, e.g. should the vehicle straddle a rock.

The transmission in accordance with the invention has combined therewith a brake which can be used as a substitute for the brake otherwise required on the live axle of the vehicle or any other powered device employing a transmission and a brake. The new brake and transmission combination needs substantially no additional assembly steps other than those required to mount the transmission and to connect the brake with an operating pedal or link. The brake is compact and consumes little space on the vehicle, and the brake is not exposed to possible obstacles and damage.

It is, therefore, a principal object of the invention to provide a transmission combined with a brake for use with a powered device, such as a small vehicle.

Another object of the invention is to provide a transmission housing with a disc brake assembly mounted thereon.

Still another object of the invention is to provide a combined transmission and brake having the advantages outlined above.

Numerous other objects and advantages of the invention will be apparent from the following detailed description of a preferred embodiment thereof, reference being made to the accompanying drawings, in which:

FIG. 1 is a side view in elevation of a transmission embodying the invention;

2

FIG. 2 is a front view of the transmission of FIG. 1;
FIG. 3 is an enlarged view in vertical cross section showing the brake combined with the transmission in more detail;
FIG. 4 is an enlarged front view of the brake components shown in FIG. 3;
FIG. 5 is a further enlarged view in perspective of the brake jaw;
FIG. 6 is a detailed side view in elevation of an emergency brake lever which can be employed with the brake; and
FIG. 7 is a detailed front view in elevation of part of the brake and the emergency brake lever.

Referring to the drawing, and more particularly to FIGS. 1 and 2, a transmission embodying the invention is indicated at 10 and includes an upper housing half 12 and a lower housing half 14. The transmission has a shift lever 16 extending upwardly therefrom and a drive or input shaft 18 extending therebelow. The shaft extends downwardly below a platform or mounting plate 20 on which the transmission is mounted, the plate 20 being part of the vehicle or other powered device with which the transmission is used. The input shaft 18 is connected to a first driven or intermediate shaft 21 through internal bevel gears and spur gears (not shown) which form no part of the invention. A second driven or output shaft 22 can be mechanically connected to the intermediate shaft 21 through any of several sets of gears as selected by the shift lever 16 through internal shifting forks, in the usual manner. In this instance, the output shaft 22 has a drive sprocket 24 affixed to one end thereof to drive a live axle or other driven component of the vehicle or other powered device. The input shaft 18 can be connected to the engine through a pulley and V-belt arrangement, for example.

In accordance with the invention, one of the driven shafts, the output shaft 22 in this instance, extends outwardly beyond the transmission housing halves 12 and 14, preferably on the side opposite the sprocket 24, although the brake and sprocket can be on the same side if such is desirable for a particular application. As shown in FIG. 3, the shaft extends through a bushing 26 and a seal 28 where it has two spaced annular grooves 30 receiving split retaining rings 32. A brake disc element 34 is mounted on the shaft between the rings 32. The disc element 34 includes an annular disc 36 and a hub 38 which is affixed to the shaft 22 by a key 40. With this arrangement, the disc element 34 rotates with the shaft but can move longitudinally thereof to a limited extent, between the retaining rings 32. The disc element 34 preferably is made of powdered metal to provide a more effective component.

The lower housing half 14 has a generally inverted U-shaped recess 42 cast therein to receive and hold a first friction puck or body 44 which is also of generally inverted U-shaped configuration and is made of a suitable friction material. The puck 44 has a thickness exceeding the depth of the recess 42 so as to protrude outwardly therefrom and be capable of engaging a rear annular surface of the disc 36.

The lower housing half 14 also has a boss 46 cast therein below the recess 42 with the boss having a threaded hole 48 to receive a screw or rod 50 constituting an elongate supporting member. The screw has a smooth cylindrical shank 52 and an enlarged head 54, along with a threaded end 56 turned into the recess 48.

A brake jaw or element 58 is supported on the cylindrical shank 52 and has a passage 60 through which the screw 50 extends. An upper portion of the brake jaw 58 has a recess 62 which is of the same generally inverted U-shaped configuration as the recess 42 and carries a friction puck or body 64 which can be identical to the puck 44. The jaw 58 holds the puck 64 in general alignment with the puck 44 on the side of the annular disc 36 opposite the puck 44. The brake jaw 58 and the puck 64 are urged away from the annular disc 36 preferably by a coil spring 66 (FIG. 3) positioned around the shank 52 of the screw 50 with one end bearing against the housing half 14 and the other end portion received in a recess 68 of the brake jaw 58 which extends around a lower portion of the screw 50.

The upper portion of the brake jaw 58 on the side opposite the recess 62 has a contoured ridge 70 (FIG. 5) forming a cam by means of which the jaw is moved inwardly against the force of the spring 66 to squeeze the annular disc 36 between the pucks 44 and 64. The cam formed by the ridge 70 preferably is of a symmetrical design forming two cam surfaces 72 and 74 reaching an apex at a raised center strip 76. With this arrangement, the jaw can be operated by a lever mounted in at least two different positions to provide greater adaptability for the transmission. The front surface of the brake jaw 58 also has lower recesses forming additional cam surfaces 78 and 80 which extend and meet at a center strip 82. The diametrically opposite cam surfaces 72 and 78 or 74 and 80 can be simultaneously engaged by a brake lever to provide inwardly directed forces on the brake jaw 58 on both sides of the supporting screw 50.

For operating the brake, a brake lever 84 is pivotally supported on the screw 50 between the outer surface of the brake jaw 58 and the enlarged head 54 of the screw. The brake lever 84 has an extension 86 extending beyond the screw and is designed to bear against one of the cam surfaces 72 or 74, surface 74 in this instance. When the lever 84 is turned, the extension 86 rides upwardly on the cam surface 74 and forces the jaw inwardly. The brake lever 84 also has a projection or dog 88 which extends into one of the cam recesses and contacts surface 78 or 80, surface 80 in this instance, and rides on the surface when the lever is turned. The diametrically opposed forces established by the extension 86 and the projection 88 on the cam surface 74 and the cam surface 80 thereby move the jaw 58 inwardly smoothly and without binding. The brake lever 84 has a suitable arm 90 extending away from the screw 50 on the same side as the projection 88. The length of the arm 90 will depend on the particular application and position of the transmission on the vehicle or other powered device on which it is mounted. As shown, the arm 90 has an opening 92 therein which receives a brake rod 94 connected to a suitable foot pedal (not shown) or other device for placing a force on the rod and moving the lever 84 in a clockwise direction, as shown in FIGS. 1 and 4. When the pedal is released, the coil spring 66 will aid in urging the lever 84 back to its original position through the cooperation of the lever extension and projection and the jaw cam surfaces.

The transmission according to the invention also can provide a relatively simple emergency brake. As shown in FIGS. 6 and 7, a hand-operated emergency brake lever indicated at 96 can be pivotally supported on a modified supporting screw 98 by a pin 100 adjacent the outer surface of the lever 84. The emergency brake lever 96 has a handle 102 which is positioned to be accessible to the operator. The lever also has bifurcated cam legs 104 with arcuate surfaces 106 designed to engage the outer surface of the brake lever 84 and force it inwardly, along with the brake jaw 58. The cam surfaces 106 of the legs 104 are designed to be self-locking so that when the handle 102 is rotated in a clockwise direction, it will remain in position until pushed downwardly again by the operator.

The symmetrical configuration of the cams on the brake jaw enables the brake lever to be located in at least two different positions, as mentioned above. Also, the molds for the lower transmission housing half 14 can be provided with inserts for forming the puck recess 42 and the threaded passage 48 so that these can be formed in the other side of the housing 14, adjacent the portion where the drive sprocket 24 is now located, by repositioning the inserts.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. In combination, a housing, an input shaft for said housing, a driven shaft in said housing and extending outwardly therefrom, said housing having means adjacent said driven shaft for holding a first friction body, a supporting rod positively secured to and extending from said housing, a brake jaw movably mounted on said rod, said jaw having means for holding a second friction body, a brake lever mounted on said rod, said brake jaw having means which, when engaged by said lever, moves the second friction body toward the first friction body, and a disc-like element rotatable with said driven shaft and having a portion between said first and second friction bodies to be engaged by said bodies to stop said driven shaft when so engaged.

2. The combination according to claim 1 characterized by resilient means located between said brake jaw and said housing for urging said brake jaw away from said housing.

3. The combination according to claim 1 characterized by said housing friction body holding means constituting a recess in said housing.

4. A transmission comprising a housing having a shaft with an end portion extending outwardly away from said housing, a first friction body supported by said housing, a second friction body, a brake element supporting said second friction body, an elongate supporting member supporting said brake element by said transmission housing for movement of said element toward and away from said housing, said elongate supporting member being positively secured to said housing, means carried on said shaft and rotatable therewith with a portion extending between said friction bodies, and means for moving at least one of said friction bodies toward the other and comprising a brake actuating lever pivotally mounted on said elongate supporting member on the side of said brake element opposite said first friction body and effective to move said brake element and said second friction body supported thereby toward said first fritcion body.

5. In combination, a housing, a rotatable shaft having an end portion extending outwardly beyond said housing, said housing having means adjacent said rotatable shaft for holding a first friction body, an elongate supporting member extending from said housing, said elongate supporting member being positively secured to said housing, a brake jaw movably mounted on said elongate member, said jaw having means for holding a second friction body, a brake lever rotatably supported by said housing, said brake jaw having means which, when engaged by said lever, moves the second friction body toward the first friction body, a disc-like element rotated with said rotatable shaft and having a portion between said first and second friction bodies to be engaged by said bodies to stop said shaft when so engaged, and remotely controlled means connected to said lever for enabling an operator to operate said lever from a remote location.

6. In combination, a housing, an input shaft for said housing, a driven shaft in said housing and extending outwardly therefrom, said housing having means adjacent said driven shaft for holding a first friction body, a supporting rod extending from said housing, a brake jaw movably mounted on said rod, said jaw having means for holding a second friction body, a brake lever mounted on said rod, said brake jaw having a cam member sloping in a given direction which, when engaged by said lever, moves the second friction body toward the first friction body, and a disc-like element rotatable with said driven shaft and having a portion between said first and second friction bodies to be engaged by said bodies to stop said driven shaft when so engaged.

7. The combination according to claim 6 characterized further by a second cam member associated with said first cam member and sloping generally in the opposite direction.

8. In combination, a housing, an input shaft for said housing, a driven shaft in said housing and extending outwardly therefrom, said housing having means adjacent said driven shaft for holding a first friction body, a supporting member extending from said housing, a brake jaw movably mounted on said member, said jaw having means for holding a second friction body, a brake lever mounted on said member, said brake jaw having means which, when engaged by said lever, moves the second friction body toward the first friction body, a disc-like element rotatable with said driven shaft and having a portion between said first and second friction bodies to be engaged by said bodies to stop said driven shaft when so engaged, and an emergency brake lever mounted adjacent said brake jaw and effective to move said brake jaw toward said first friction body when said emergency brake lever is actuated by an operator.

9. The combination according to claim 8 characterized by said emergency brake lever being pivotally mounted on said supporting member.

10. A transmission comprising a housing having a shaft with an end portion extending outwardly away from said housing, a first friction body supported by said housing, a second friction body, a brake element supporting said second friction body, an elongate supporting member supporting said brake element by said transmission housing for movement of said element toward and away from said housing, means carried on said shaft and rotatable therewith with a portion extending between said friction bodies, and means for moving at least one of said friction bodies toward the other and comprising a brake actuating lever having means connected thereto for pivoting said lever, said lever being pivotally mounted on said elongate supporting member on the side of said brake element opposite said first friction body, said brake element having a sloping cam surface positioned to be engaged by a portion of said lever to cause movement of said brake element axially of said elongate supporting member in a direction toward said first friction body when said lever is pivoted and engaged with said cam surface.

11. A transmission according to claim 10 characterized further by said brake element having a second cam surface on the side of said elongate supporting element generally opposite said first cam surface, and said lever having means for engaging said second cam surface simultaneously with said first cam surface to provide a moving force on said brake element on both sides of said elongate supporting member.

References Cited

UNITED STATES PATENTS

| 1,853,157 | 4/1932 | Spira | 188—71 |
| 2,021,124 | 11/1935 | Laming | 188—71 |
| 3,000,477 | 9/1961 | Dunn | 188—71 |
| 3,038,564 | 6/1962 | Lee et al. | 188—71 |
| 3,183,020 | 5/1965 | Hawver | 188—71 |
| 3,221,845 | 12/1965 | Hansen | 188—71 |

MARTIN P. SCHWADRON, Primary Examiner

L. J. PAYNE, Assistant Examiner

U.S. Cl. X.R.

74—411.5; 188—71